US011810189B2

(12) United States Patent
Awasthy

(10) Patent No.: US 11,810,189 B2
(45) Date of Patent: *Nov. 7, 2023

(54) BLOCKCHAIN SYSTEMS AND METHODS FOR MANAGING PROPERTY LOAN INFORMATION

(71) Applicant: State Farm Mutual Automobile Insurance Company, Bloomington, IL (US)

(72) Inventor: Lokesh Awasthy, Santa Clara, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,272

(22) Filed: Nov. 14, 2022

(65) Prior Publication Data

US 2023/0073608 A1   Mar. 9, 2023

Related U.S. Application Data

(63) Continuation of application No. 15/880,103, filed on Jan. 25, 2018, now Pat. No. 11,501,365.

(60) Provisional application No. 62/460,216, filed on Feb. 17, 2017.

(51) Int. Cl.
  *G06Q 40/03* (2023.01)
  *G06Q 20/38* (2012.01)
  *H04L 9/30* (2006.01)

(52) U.S. Cl.
  CPC .......... *G06Q 40/03* (2023.01); *G06Q 20/389* (2013.01); *H04L 9/30* (2013.01); *G06Q 2220/00* (2013.01)

(58) Field of Classification Search
  CPC .... G06Q 20/00–425; G06Q 40/00–128; H04L 9/00–50
  See application file for complete search history.

(56) References Cited

U.S. PATENT DOCUMENTS

| 10,990,693 | B1 | 4/2021 | Newman |
| 2016/0092982 | A1 | 3/2016 | Kelly |
| 2017/0177855 | A1 | 6/2017 | Costa Faidella et al. |
| 2017/0213209 | A1 | 7/2017 | Dillenberger |
| 2017/0228734 | A1 | 8/2017 | Kurian |
| 2017/0330179 | A1 | 11/2017 | Song et al. |
| 2017/0353311 | A1 | 12/2017 | Schukai et al. |

(Continued)

FOREIGN PATENT DOCUMENTS

| WO | 2017066002 A1 | 4/2017 |
| WO | 2017145019 A1 | 8/2017 |

(Continued)

*Primary Examiner* — Mohammad A. Nilforoush
(74) *Attorney, Agent, or Firm* — Armstrong Teasdale LLP

(57) ABSTRACT

Information may be managed using blockchains. An access computing device may be configured to access a blockchain network including a plurality of node computing devices that store a respective copy of a plurality of blockchains, each blockchain including a sequence of one or more blocks. The access computing device may manage communication of data between the blockchain network and a user. The access computing device may transmit instructions to a node computing device to generate new blocks in the blockchain associated with new and/or updated transaction.

18 Claims, 9 Drawing Sheets

(56) References Cited

U.S. PATENT DOCUMENTS

2017/0372300 A1   12/2017  Dunlevy et al.
2018/0115538 A1    4/2018  Blake
2020/0234386 A1    7/2020  Blackman et al.
2020/0327498 A1* 10/2020  Weber ................ G06Q 20/3678

FOREIGN PATENT DOCUMENTS

WO       2017178956 A1   10/2017
WO       2017190175 A1   11/2017

* cited by examiner

BLOCKCHAIN SYSTEMS AND METHODS FOR MANAGING PROPERTY LOAN INFORMATION

CROSS-REFERENCE TO RELATED APPLICATIONS

This application is a continuation application of and claims priority to U.S. patent application Ser. No. 15/880,103, filed Jan. 25, 2018, which claims the benefit of priority to U.S. Provisional Patent Application No. 62/460,216, filed Feb. 17, 2017, entitled "BLOCKCHAIN SYSTEMS AND METHODS FOR MANAGING PROPERTY LOAN INFORMATION," the entire contents and disclosure of each of which are hereby incorporated herein by reference in their entirety.

FIELD OF THE DISCLOSURE

The present disclosure relates to managing property loan information and, more particularly, to network-based systems and methods for generating and managing property loan information using blockchain technologies.

BACKGROUND

When obtaining and/or refinancing a loan for a personal property asset (e.g., a vehicle, a property or building, etc.), a user or customer may be required to provide information about any existing liens on the personal property asset. In order to decide whether to offer a new loan on the personal property asset, the loan-providing entity may use customer-provided data (e.g., customer data, data about the personal property asset) to determine and/or confirm information about the existing loan. In at least some known systems, the process to retrieve information about the existing loan is a manual process, performed by a human analyst tasked with reaching out to the provider of the existing loan (e.g., over the phone). Generally, loan providers have teams of analysts to perform this process, which is prone to error, inefficient, time-consuming, and (in terms of required personnel) expensive. In at least some cases, a customer may have to wait days to weeks for a response indicating whether they will be offered a new loan.

In addition, even if a new loan is offered and the customer accepts the terms of the new loan, a transfer of funds between the loan-providing entities (e.g., a payoff of the existing loan) and a subsequent transfer of title and/or lien is executed and performed manually, which further extends the time it takes to complete the provision of the new loan. Accordingly, the current systems and methods for managing property loan information may be undesirable for customers as well as loan-providing entities.

BRIEF SUMMARY

The present embodiments may relate to blockchain-based systems and methods for managing property loan information, such as for vehicle loans, home loans, and/or any other loan or lien associated with a personal property asset. A Loan Management (LM) computer system may include an access computer device and at least one blockchain node computing device of a blockchain network. The access computer device may be associated with a loan provider and/or a loan applicant ("user"). The blockchain network may function as a storage platform for loan information association with a plurality of personal property assets, such as vehicles and buildings. The access computing device may be configured to communicate with the at least one blockchain node computing device to retrieve information from a blockchain associated with a particular personal property asset and/or to update information stored on the blockchain, such as by adding a new block thereto.

In one aspect, a computer-implemented method of operating a computer system to manage information using blockchains is provided. The method is implemented using an access computing device of the computer system, the method comprising: (a) receiving, from a user, a request for information from a first blockchain, the request including: (i) an asset identifier associated with a personal property asset, (ii) a user identifier associated with the user, and (iii) a user consent to use the asset identifier and the user identifier in a blockchain query; (b) in response to receiving the request, automatically transmitting the blockchain query including the asset identifier and the user identifier to a blockchain node computing device in a blockchain network, the asset identifier causing the blockchain node computing device to retrieve the first blockchain and validate the user identifier with a last block in the first blockchain, the last block including an encryption of first transaction information associated with the personal property asset and the user; (c) accessing a public key to decrypt the encryption of the existing loan information using a decryption scheme associated with the public key; (d) transmitting, to a remote computing device, second transaction information for a second transaction based at least in part upon the decrypted first transaction information; (e) receiving, from the remote computing device, an acceptance notification indicating acceptance of the second transaction information; and (f) in response to said receiving the acceptance notification: (I) electronically executing a smart contract based on the accepted second transaction information, the executing including transferring, using the smart contract, funds associated with the second transaction and updating, using the smart contract, a title associated with the personal property asset; and (II) automatically transmitting an update instruction to the blockchain node computing device, the update instruction including an encryption of the second transaction information and an encryption of the representation of the executed smart contract, the update instruction causing the blockchain node computing device to generate and store a new block subsequent to the last block, the new block including (i) the encryption of the second transaction information that supersedes the first transaction information, (ii) the encryption of the representation of the executed smart contract, and (iii) a description of data stored in the last block. The method may include additional, fewer, or alternative steps, including those described elsewhere herein.

In another aspect, an access computing device for managing information using blockchains is provided. The access computing device includes at least one processor in communication with at least one memory device, and the access computing device is configured to: (a) receive, from a user, a request for information from a first blockchain, the request including: (i) an asset identifier associated with a personal property asset, (ii) a user identifier associated with the user, and (iii) a user consent to use the asset identifier and the user identifier in a blockchain query; (b) in response to receiving the request, automatically transmit the blockchain query including the asset identifier and the user identifier to a blockchain node computing device in a blockchain network, the asset identifier causing the blockchain node computing device to retrieve the first blockchain and validate the user identifier with a last block in the first blockchain, the last block including an encryption of first transaction information associated with the personal property asset and the user; (c) access a public key to decrypt the encryption of the existing loan information using a decryption scheme associated with the public key; (d) transmit, to a remote computing device, second transaction information for a second transaction based at least in part upon the decrypted first transaction information; (e) receive, from the remote computing device, an acceptance notification indicating acceptance of the second transaction information; and (f) in response to receiving the acceptance notification: (I) electronically execute a smart contract based on the accepted second transaction information, the executing including transferring, using the smart contract, funds associated with the second transaction and updating, using the smart contract, a title associated with the personal property asset; and (II) automatically transmit an update instruction to the blockchain node computing device, the update instruction including an encryption of the second transaction information and an encryption of the representation of the executed smart contract, the update instruction causing the blockchain node computing device to generate and store a new block subsequent to the last block, the new block including (i) the encryption of the second transaction information that supersedes the first transaction information, (ii) the encryption of the representation of the executed smart contract, and (iii) a description of data stored in the last block. The access computing device may have additional, less, or alternate functionality, including that discussed elsewhere herein.

In one aspect, a computer-implemented method of operating a computer system to manage loan information using blockchains may be provided. The method may be implemented using an access computing device of the computer system. The method may include accessing a blockchain network through a first blockchain node computing device, the blockchain network including a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block. The method may also include receiving a request for information from a first blockchain of the plurality of blockchains, the request including an asset identifier associated with a personal property asset. The method may further include transmitting a query including the asset identifier to the first blockchain node computing device, the asset identifier identifying the first blockchain and causing the blockchain node computing device to identify a last block in the first blockchain, the last block including an encryption of existing loan information for an existing loan associated with the personal property asset. The method may additionally include receiving the encryption of the existing loan information from the first blockchain node computing device, and accessing a public key to decrypt the encryption of the existing loan information. The method may further include transmitting new loan information for a new loan associated with the personal property asset based at least in part upon the decrypted existing loan information, the new loan information superseding the existing loan information. In addition, the method may include receiving an acceptance notification indicating acceptance of the new loan information, and, in response to said receiving the acceptance notification, automatically transmitting an update instruction to the first blockchain node computing device, the update instruction including the new loan information, the update instruction causing the first blockchain node computing device to generate and store a new block subsequent to the last block, the new block including an encryption of the new loan information and a description of data stored in the last block. The method may include additional, fewer, or alternative steps, including those described elsewhere herein.

In another aspect, an access computing device for managing loan information using blockchains may be provided. The access computing device may include at least one processor in communication with at least one memory device. The access computing device may be configured to access a blockchain network through a first blockchain node computing device, the blockchain network including a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block. The access computing device may also be configured to receive a request for information from a first blockchain of the plurality of blockchains, the request including an asset identifier associated with a personal property asset. The access computing device may be further configured to transmit a query including the asset identifier to the first blockchain node computing device, the asset identifier identifying the first blockchain and causing the blockchain node computing device to identify a last block in the first blockchain, the last block including an encryption of existing loan information for an existing loan associated with the personal property asset. The access computing device may additionally be configured to receive the encryption of the existing loan information from the first blockchain node computing device, and access a public key to decrypt the encryption of the existing loan information. The access computing device may also be configured to transmit new loan information for a new loan associated with the personal property asset based at least in part upon the decrypted existing loan information, the new loan information superseding the existing loan information. In addition, the access computing device may be configured to receive an acceptance notification indicating acceptance of the new loan information, and, in response to receiving the acceptance notification, automatically transmit an update instruction to the first blockchain node computing device, the update instruction including the new loan information, the update instruction causing the first blockchain node computing device to generate and store a new block subsequent to the last block, the new block including an encryption of the new loan information and a description of data stored in the last block. The access computing device may have additional, less, or alternate functionality, including that discussed elsewhere herein.

In yet another aspect, at least one non-transitory computer-readable storage medium having computer-executable instructions embodied thereon may be provided. When executed by at least one processor of an access computing device, the computer-executable instructions may cause the at least one processor to access a blockchain network through a first blockchain node computing device, the blockchain network including a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block. The computer-executable instructions may also cause the at least one processor to receive a request for information from a first blockchain of the plurality of blockchains, the request including an asset identifier associated with a personal property asset. The computer-executable instructions may further cause the at least one processor to transmit a query including the asset identifier to the first blockchain node computing device, the asset identifier identifying the first blockchain and causing the blockchain node computing device to identify a last block in the first blockchain, the last block including an encryption of existing loan information for an existing loan associated with the personal property asset. Additionally, the computer-executable instructions may cause the at least one processor to receive the encryption of the existing loan information from the first blockchain node computing device, and access a public key to decrypt the encryption of the existing loan information. The computer-executable instructions may also cause the at least one processor to transmit new loan information for a new loan associated with the personal property asset based at least in part upon the decrypted existing loan information, the new loan information superseding the existing loan information. In addition, the computer-executable instructions may also cause the at least one processor to receive an acceptance notification indicating acceptance of the new loan information, and, in response to receiving the acceptance notification, automatically transmit an update instruction to the first blockchain node computing device, the update instruction including the new loan information, the update instruction causing the first blockchain node computing device to generate and store a new block subsequent to the last block, the new block including an encryption of the new loan information and a description of data stored in the last block. The computer-executable instructions may cause the at least one processor to perform additional, fewer, and/or alternative functions.

In a further aspect, a loan management (LM) computer system for managing property loan information using blockchains may be provided. The LM computer system may include a first blockchain node computing device integral to a blockchain network. The blockchain network may include a plurality of blockchain node computing devices including the first blockchain node computing device. The first blockchain node computing device may be configured to store a local copy of a plurality of blockchains, each blockchain including a sequence of one or more blocks, wherein each block is cryptographically verifiable and enforces a chronological order of data stored in subsequent blocks, and wherein each block after a first block includes a description of data stored in a previous block. The LM computer system may also include an access computing device communicatively coupled to the first blockchain node computing device such that the access computing device has access to the plurality of blockchains stored in the blockchain network. The LM computer system may be configured to receive, at the access computing device, a request to access the blockchain network, the request including an asset identifier associated with a personal property asset, and transmit, from the access computing device to the first blockchain node computing device, an instruction associated with the request, the instruction including the asset identifier. The LM computer system may also be configured to, in response to receiving the query, at the first blockchain node computing device, when the asset identifier is associated with a first existing blockchain stored at the first blockchain node computing device, retrieve encrypted existing loan information from a last block of the first existing blockchain and transmit the encrypted existing loan information to the access computing device. Additionally, the LM computer system bay be configured to, in response to receiving the query, at the first blockchain node computing device, when the asset identifier is not associated with any existing blockchain stored at the first blockchain node computing device, generate a first block of a new blockchain associated with the asset identifier.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
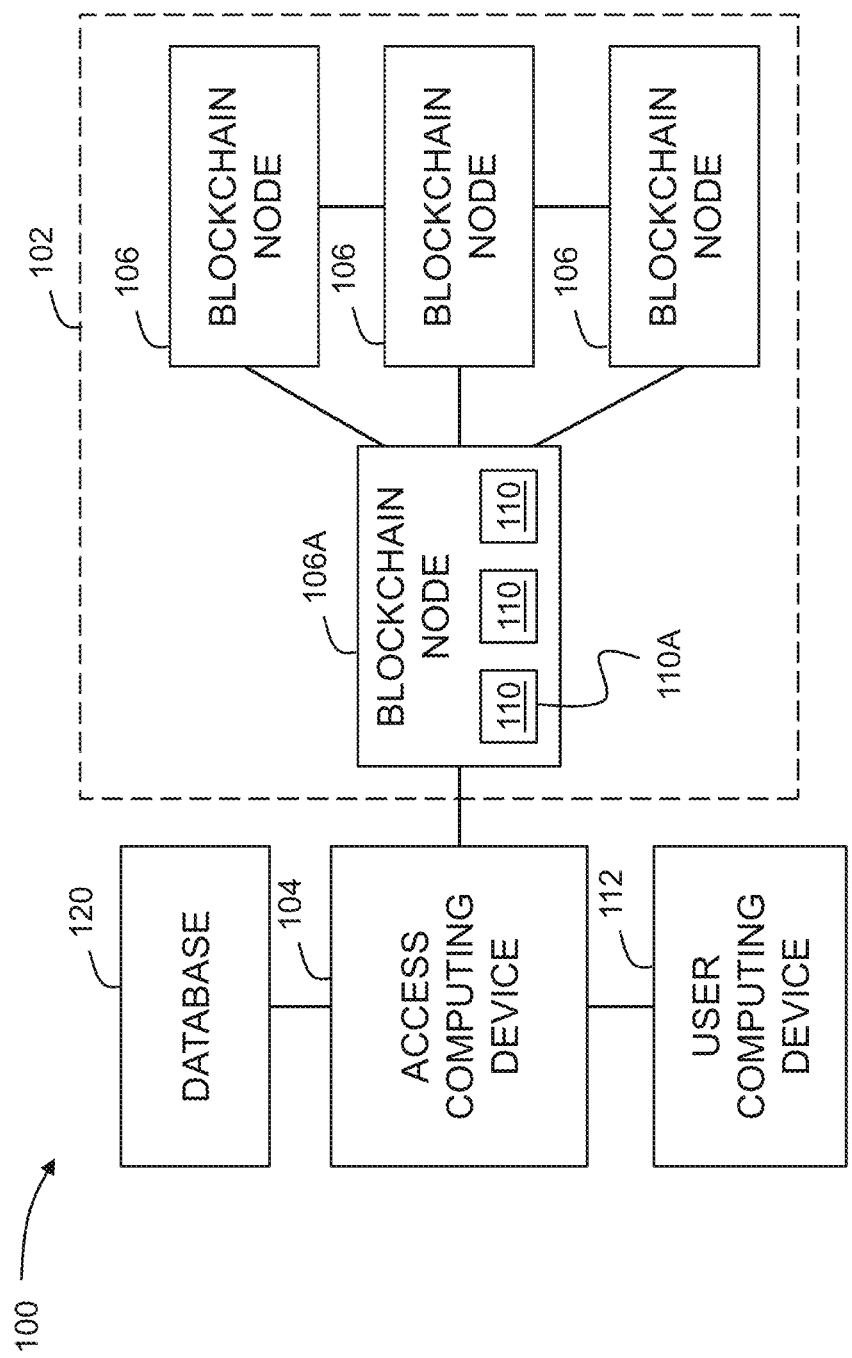
FIG. 1 depicts an exemplary computing environment for implementing a loan management (LM) computer system for managing property loan information.

The Figures depict preferred embodiments for purposes of illustration only. One skilled in the art will readily recognize from the following discussion that alternative embodiments of the systems and methods illustrated herein may be employed without departing from the principles of the disclosure provided herein.

DETAILED DESCRIPTION

The present embodiments may relate to, inter alia, systems and methods for managing personal property asset loan information using blockchains. In one exemplary embodiment, the process may be performed by a computer device associated with a loan provider and/or with a loan applicant, also known as an access computer device, in communication with a blockchain network. In the exemplary embodiments, a Loam Management (LM) computer system, including the access computer device and/or one or more blockchain node computing devices of the blockchain network, may be configured to facilitate automating a loan management process. "Loan management" may refer to loan application processes, such as receiving and processing loan applications from applicants, to loan registration processes, such as the execution of new loans, and/or to loan update processes, such as updating terms of an existing loan, for instance, during an in-house loan refinance. "Loan provider" may refer to any entity that may provide loans associated with personal property asset(s) to loan applicants.

The LM computer system described herein may include one or more blockchain node computing devices of a blockchain network, wherein the blockchain network provides an encrypted, distributed, and immutable ledger in which loan information associated with a plurality of personal property assets are stored. Each blockchain node computing device stores a local, complete copy of the ledger as a plurality of blockchains. A blockchain is a distributed database that maintains a continuously-growing list of ordered records, known as blocks. Each blockchain may include a sequence of one or more blocks, wherein each block is cryptographically verifiable and enforces a chronological order of data stored in subsequent blocks. In one exemplary embodiment, the one or more blocks may include a first block representing a first transaction—or registration of loan information—associated with a personal property asset. The one or more blocks may additionally include subsequent blocks, each subsequent block after the first block including a description of data stored in the immediately previous block and/or a link to the previous block. In one exemplary embodiment, each subsequent block in a blockchain may include loan information associated with subsequent loans on the personal property asset and/or updates to existing loans.

In some exemplary embodiments, the description of data stored in the previous block and/or the link to the previous block may include a hash of data stored in the previous block. The hash (which may be referred to as a "hash value") may be generated by executing a hashing function on the data stored in the previous block. This continues on, with each block adding on to the next while containing a hash of the previous block(s) in the blockchain. In this way, the chronological series of data stored in a single blockchain may be verifiable and immutable. The LM computer system may include and/or access at least one blockchain node computing device, thereby facilitating access to the distributed blockchain network through the at least one blockchain node computing device.

To ensure the security of the information contained in the blockchain, copies of the blockchain may be distributed across multiple computer devices, known as nodes or blockchain node computing devices. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

In some embodiments, data stored in a block of a blockchain may be encrypted using any suitable encryption process(es), thereby improving the security of the data stored therein. In some embodiments, a block may include and/or otherwise provide access to a public key that enables decryption of encrypted data stored in the block. In other embodiments, a public key may be securely distributed to access computer device(s) that are verified to have entitlement access to the data within a block and/or within the blockchain network.

In one exemplary embodiment, the blockchain network may function as a platform for storage of loan information associated with personal property assets. "Personal property assets" may include, for example, but not limited to, personal vehicles, cars, trucks, boats, ATVs, motorcycles, commercial vehicles, buildings, homes, residences, objects, and/or land. The blockchain network may further function to store smart contracts that execute upon satisfaction of one or more execution criteria. The execution criteria may be set forth during the loan application phase, and are satisfied, in some embodiments, upon acceptance of the smart contract by a loan applicant. Execution of the smart contract may automatically trigger a transfer of funds (e.g., from a new loan provider to an existing loan provider) and/or a transfer of a title or other ownership document associated with the personal property asset.

In the exemplary embodiment, the access computing device described herein may be configured to access the blockchain network through a first blockchain node computing device. The access computing device may be further configured to receive (e.g., directly and/or from a user computing device) a request for information from a first blockchain of the plurality of blockchains, the request including an asset identifier associated with a personal property asset. The request for information may include a new loan application.

The access computing device may also be configured to transmit a query including the asset identifier to the first blockchain node computing device, the asset identifier identifying the first blockchain. The query may cause the blockchain node computing device to identify a last block in the first blockchain, wherein the last block includes an encryption of existing loan information associated with the personal property asset. The access computing device may receive the encryption of the existing loan information from the first blockchain node computing device. In some embodiments, the access computing device may access a public key to decrypt the encryption of the existing loan information. The access computing device may transmit (e.g., to the user computing device, or to a display of the access computing device) new loan information associated with the personal property asset based at least in part upon the decrypted existing loan information. The new loan information may be associated with a new loan offered to a user (e.g., a loan applicant) and may replace or supersede the existing loan information.

Upon receiving (e.g., from the user computing device or from an input device of the access computing device) an acceptance notification indicating acceptance of the new loan information, the access computing device may automatically transmit an update instruction to the first blockchain node computing device. The update instruction may include an encryption of the new loan information and/or may cause the first blockchain node computing device to encrypt the new loan information. The update instruction may cause the first blockchain node computing device to generate and store a new block subsequent to the last block, the new block including the encryption of the new loan information and a description of data stored in the last block (e.g., a hash of the last block).

In some embodiments, when a loan applicant accepts an offer of the new loan (e.g., upon receiving the acceptance notification), a smart contract (which may be an electronic or virtual contract) may be generated. As will be explained further below, a smart contract may be based upon a blockchain structure. In the exemplary embodiment, the smart contract includes all of the information about the new loan as well as asset data to link the smart contract to the first blockchain. In the exemplary embodiment, the smart contract may be stored in a plurality of locations including the access computing device, a database, and/or the blockchain network. In the exemplary embodiment, the smart contract is transmitted to the first blockchain node computing device for storage and distribution to the plurality of other blockchain node computing devices, to update their local copies of the first blockchain with the smart contract.

Automating loan management processes may facilitate reducing the latency of loan management, from a time period of several days or weeks to as little as a matter of minutes. Moreover, the costs associated with loan management may be substantially reduced, as well as the instance of human error. Implementing this automation using blockchain technology may eliminate any need for third-party providers of loan information, may improve security of loan information due to the decentralized and encrypted nature of blockchain technology, and may facilitate the use of "smart contract" technology hosted in blockchain blocks. The systems and methods herein may further facilitate the execution of these smart contracts automatically, as well as automatic transfer of funds and/or transfer of asset title upon execution of the smart contracts. Broadly, the systems and methods provided herein may facilitate improving the processing speed of loan management by orders of magnitude due to automation, thereby reducing cost to customers as well as providers, while improving data security and reducing data exposure to third parties.

In addition, the substantially seamless loan information transmission between loan providers, facilitated by the distributed computing architecture of the blockchain network, may support improved inter-provider data communication, such as the automatic transfer of funds and/or transfer of asset title. By facilitating the automatic execution and storage (e.g., within the blockchain) of smart contracts, the systems and methods provided herein may further facilitate the leveraging of stored loan information into additional products and services. For instance, in some cases, escrows may be built, documents may be validated and stored, and/or compliance audits may be improved, leveraging the blockchain network.

At least one of the technical problems addressed by this system may include: (i) improving speed and accuracy of applying for and/or receiving new loans on personal property assets; (ii) allowing for automatic updates to a loan "ledger" on a blockchain platform; (iii) improving the online security of stored loan information through the blockchain technology; (iv) reducing timeline and costs associated with new and/or re-financed loans; and/or (v) improving inter-institution accessibility of loan information while eliminating the need for third-party information providers.

The methods and systems described herein may be implemented using computer programming or engineering techniques including computer software, firmware, hardware, or any combination or subset thereof, wherein the technical effects may be achieved by performing at least one of the following steps: (a) accessing a blockchain network through a first blockchain node computing device, the blockchain network including a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block; (b) receiving a request for information from a first blockchain of the plurality of blockchains, the request including an asset identifier associated with a personal property asset; (c) transmitting a query including the asset identifier to the first blockchain node computing device, the asset identifier identifying the first blockchain and causing the blockchain node computing device to identify a last block in the first blockchain, the last block including an encryption of existing loan information for an existing loan associated with the personal property asset; (d) receiving the encryption of the existing loan information from the first blockchain node computing device; (e) accessing a public key to decrypt the encryption of the existing loan information; (f) transmitting new loan information for a new loan associated with the personal property asset based at least in part upon the decrypted existing loan information, the new loan information superseding the existing loan information; (g) receiving an acceptance notification indicating acceptance of the new loan information; and/or (h) in response to said receiving the acceptance notification, automatically transmitting an update instruction to the first blockchain node computing device, the update instruction including the new loan information, the update instruction causing the first blockchain node computing device to generate and store a new block subsequent to the last block, the new block including an encryption of the new loan information and a description of data stored in the last block.

Exemplary Loan Management System for Managing Loan Information Using Blockchains FIG. 1 depicts an exemplary computing environment 100 for implementing an LM computer system 102 for managing property loan information. LM computer system 102 may be used to manage loan information associated with loans on personal property assets using blockchain technology. In the exemplary embodiment, LM computer system 102 may include an access computing device 104 and at least one blockchain node computing device 106 (also referred to herein as "nodes" 106) of a blockchain network 108. Access computing device 104 is communicatively coupled, such as via wireless communication or data transmission over one or more radio frequency links or digital communication channels, or wired communication, or via an Application Programming Interface (API), to at least one node 106A, and node 106A is communicatively coupled to a plurality of other nodes 106B, such as via wireless communication or data transmission over one or more radio frequency links or digital communication channels, or wired communication. The plurality of nodes 106 may form blockchain network 108. Each node 106 may store a respective copy of a plurality of blockchains 110. As described further herein, each blockchain 110 may include a sequence of one or more blocks that are cryptographically verifiable and enforce a chronological order of data stored in subsequent blocks, and each block after a first block may include a description of data stored in a previous block and/or a link to the previous block.

As described herein in more detail, access computing device 104 may be configured to perform a loan registration process by, for example, (i) access blockchain network 108 through a first blockchain node computing device 106A, (ii) receive a request for information from a first blockchain 110A of the plurality of blockchains 110, the request including an asset identifier associated with a personal property asset, (iii) transmit a query including the asset identifier to first blockchain node computing device 106A, the asset identifier identifying first blockchain 110A and causing first blockchain node computing device 106A to identify a last block in first blockchain 110A, the last block including an encryption of existing loan information associated with the personal property asset, (iv) receive the encryption of the existing loan information from the first blockchain node computing device, (v) access a public key to decrypt the encryption of the existing loan information, (vi) transmit new loan information associated with the personal property asset based at least in part upon the decrypted existing loan information, the new loan information superseding the existing loan information, (vii) receive an acceptance notification indicating acceptance of the new loan information, and/or (viii) in response to receiving the acceptance notification, automatically transmit an update instruction to first blockchain node computing device 106A, the update instruction including an encryption of the new loan information, the update instruction causing first blockchain node computing device 106A to generate and store a new block subsequent to the last block, the new block including the encryption of the new loan information and a description of data stored in the last block.

In the exemplary embodiment, a loan applicant (and/or another user on behalf of the loan applicant) may interact with access computing device 104 (e.g., directly or indirectly) to perform a loan application process and/or a loan registration process. For instance, the loan applicant may interact with a website, form, software application ("app"), or other such platforms, to provide various information (e.g., user data, asset data, requested loan terms, etc.) to a loan provider using access computing device 104. In the exemplary embodiment, access computing device 104 may be associated with a loan provider entity, such that a loan applicant may interact with access computing device 104 at a location associated with the loan provider entity (e.g., at an office location associated with the loan provider entity). Alternatively, access computing device 104 may be associated with the loan applicant, such that the loan applicant may interact with access computing device 104 at substantially any time and/or in any location. Additionally or alternatively, a loan applicant may use a user computing device 112 to remotely or indirectly interact with access computing device 104. For instance, the loan applicant may use user computing device 112 to interact with a form on an app or a website, and user computing device 112 may be configured to transmit any input information to access computing device 104 for further processing as described herein.

Access computing device 104 and/or user computing device 112 may be computers that include a web browser or a software application, which enables access computing device 104 and/or user computing device 112 to access remote computer devices, such as node 106A, using the Internet or other network. More specifically, access computing device 104 and/or user computing device 112 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Access computing device 104 and/or user computing device 112 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In addition, nodes 106 may be computers configured to communicate with one another, using the Internet or other network. More specifically, nodes 106 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. In some embodiments, nodes 106 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In other embodiments, nodes 106 may be server computing devices specifically configured to function as blockchain nodes 106.

In some embodiments, access computing device 104 may function as node 106. Accordingly, where reference is made herein to access computing device 104 accessing and/or otherwise communicating with nodes 106 (e.g., with node 106A), it should be understood that such reference may equally refer to access computing device 104 accessing node functionality within access computing device 104 itself.

Access computer device 104 may be further communicatively coupled to a database 120 that stores data. For instance, database 120 may be a local or remote database 120 associated with a loan provider and configured to store data not stored in blockchain network 108 and/or store a local copy of certain data stored in blockchain network 108. In one embodiment, database 120 may store one or more smart contracts (described further herein), user, asset, and/or loan data associated with a loan provided by the loan provider associated with access computer device 104, and/or any other suitable information. In one embodiment, database 120 may be stored remotely from access computing device 104. In some embodiments, database 120 may be decentralized. In some embodiments, a user, such as a loan applicant and/or a person associated with a loan provider, may access database 120 via access computing device 104 and/or another computing device (not shown) associated with the loan provider.

In one exemplary embodiment of the present disclosure, a loan management (LM) computer system (e.g., LM computer system 102) for managing property loan information using blockchains may include a first blockchain node computing device (e.g., node 106A) integral to a blockchain network (e.g., blockchain network 108). The blockchain network may include a plurality of blockchain node computing devices (e.g., nodes 106) including the first blockchain node computing device. The first blockchain node computing device may be configured to store a local copy of a plurality of blockchains (e.g., blockchains 110), each blockchain including a sequence of one or more blocks, wherein each block is cryptographically verifiable and enforces a chronological order of data stored in subsequent blocks. Each block after a first block may include a description of data stored in a previous block. The LM computer system may also include an access computing device (e.g., access computing device 104) communicatively coupled to the first blockchain node computing device such that the access computing device has access to the plurality of blockchains stored in the blockchain network. The LM computer system may be configured to: (i) receive, at the access computing device, a request to access the blockchain network, the request including an asset identifier associated with a personal property asset, (ii) transmit, from the access computing device to the first blockchain node computing device, an instruction associated with the request, the instruction including the asset identifier, (iii) in response to receiving the query, at the first blockchain node computing device, when the asset identifier is associated with a first existing blockchain stored at the first blockchain node computing device, retrieve encrypted existing loan information from a last block of the first existing blockchain and transmit the encrypted existing loan information to the access computing device, and/or (iv) in response to receiving the query, at the first blockchain node computing device, when the asset identifier is not associated with any existing blockchain stored at the first blockchain node computing device, generate a first block of a new blockchain associated with the asset identifier.

In some embodiments, the request to access the blockchain network may include a new loan registration request, the new loan registration request including the asset identifier and new loan information associated with a new loan on the personal property asset. The LM computer system may be further configured to, at the first blockchain node computing device, generate the first block of the new blockchain including the new loan information in an encrypted format.

In other embodiments, the request to access the blockchain network may include an existing loan registration request, the existing loan registration request including the asset identifier and existing loan information associated with an existing loan on the personal property asset that is not registered with the blockchain network. The LM computer system may be further configured to, at the first blockchain node computing device, generate the first block of the new blockchain including the existing loan information in an encrypted format.

In still other embodiments, the request to access the blockchain network may include an existing loan update request, the existing loan update request including the asset identifier and an updated loan term associated with an existing loan on the personal property asset. The LM computer system may be further configured to, at the first blockchain node computing device: (i) identify the first existing blockchain associated with the personal property asset based at least in part upon the asset identifier, (ii) generate a hash of the last block of the first existing blockchain, and/or (iii) generate a new block for the first existing blockchain, the new block including the updated loan term in an encrypted format and the hash of last block.

In some embodiments, the request includes a loan application for a new loan on the personal property asset. The LM computer system may be further configured to: (i) access, at the access computing device, a public key to decrypt the encrypted existing loan information, (ii) transmit, from the access computing device to a loan applicant, new loan information for the new loan based at least in part upon the decrypted existing loan information, the new loan information superseding the existing loan information, (iii) receive, at the access computing device from the loan applicant, an acceptance notification indicating acceptance of the new loan information, (iv) in response to the acceptance notification, automatically transmit, from the access computing device to the first blockchain node computing device, an update instruction, the update instruction including the new loan information, and/or (v) in response to the update instruction, generate, at the first blockchain node computing device, a new block subsequent to the last block, the new block including an encryption of the new loan information and a description of data stored in the last block.

Exemplary Processes for Managing Property Loan Information

Figure 2:
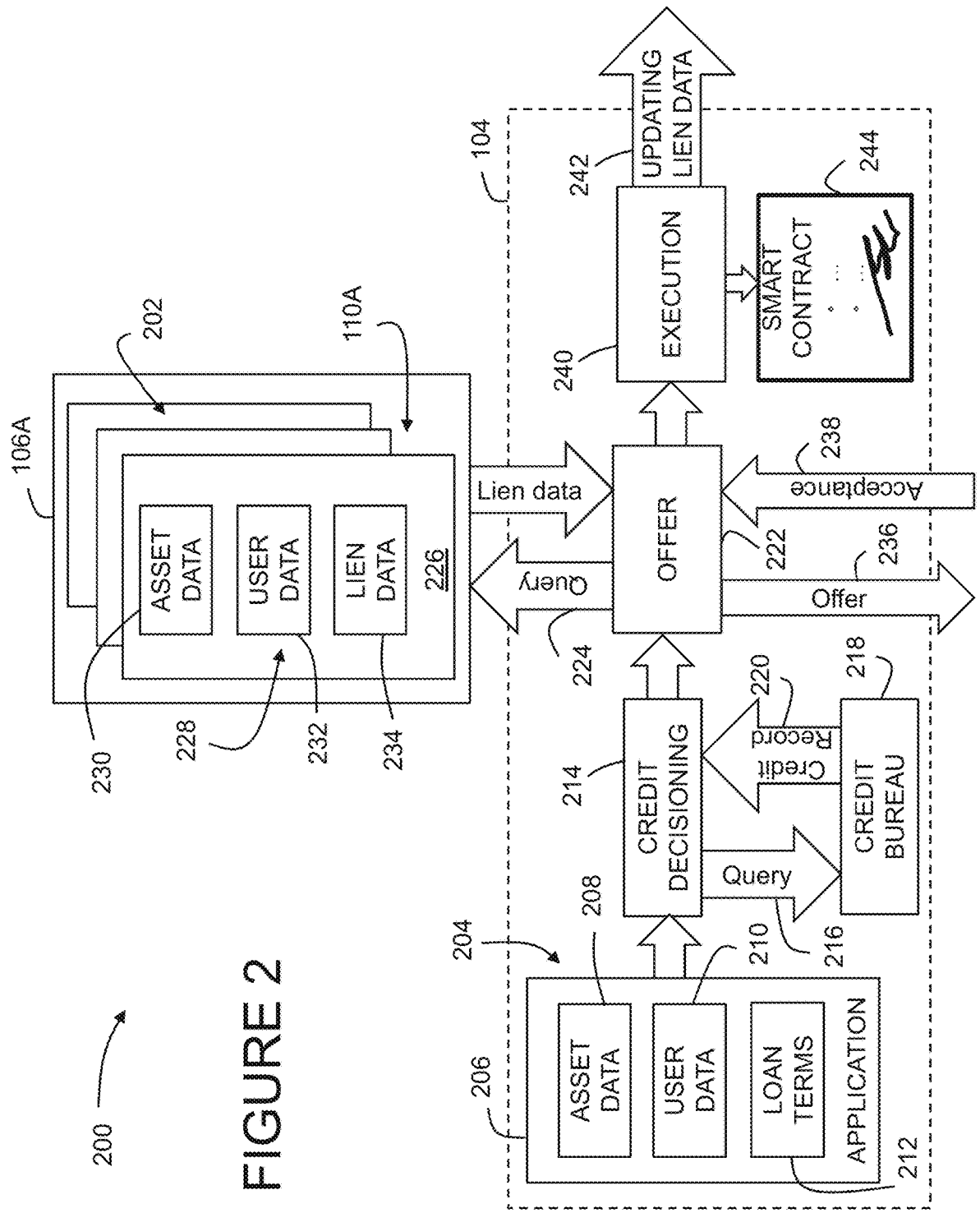
FIG. 2 illustrates a data flow diagram for one aspect of managing property loan information using the LM computer system shown in FIG. 1.

FIG. 2 illustrates a data flow diagram 200 for one aspect of managing property loan information using LM computer system 102 (shown in FIG. 1). Specifically, data flow diagram 200 depicts a loan registration or application process performed using access computing device 102 and blockchain node computing device 106A (both also shown in FIG. 1).

In the exemplary embodiment, access computing device 104 may access node 106. As described above, node 106 may be part of blockchain network 108 (shown in FIG. 1) including a plurality of nodes 106 that each store a respective copy of a plurality of blockchains 110 (also shown in FIG. 1), and each blockchain 110 may include a sequence of one or more blocks 202 that are cryptographically verifiable and enforce a chronological order of data stored in subsequent blocks 202, wherein each block 202 after a first block (not specifically shown in FIG. 2) includes a description of data stored in a previous block 202 and/or a link to the previous block 202. The description of the data in the previous block 202 and/or the link to the previous block 202 may include, in the exemplary embodiment, a hash of the previous block 202 generating using a hash function.

Access computing device 104 may receive a request 204 for information from a first blockchain 110A. First blockchain 110A is identified using information in request 204. More specifically, in the illustrated embodiment, request 204 may include a loan application 206 for a loan associated with a personal property asset. Access computing device 104 may receive request 204 (e.g., loan application 206) from a user computing device 112 (shown in FIG. 1) associated with the loan applicant. Alternatively, access computing device 104 may receive request 204 (e.g., loan application 206) from an input device of access computing device 104 (e.g., input device 720, shown in FIG. 7).

Loan application 206 may include asset data 208 associated with the personal property asset for which the loan is being requested. Asset data 208 may include, but is not limited to, an asset identifier that uniquely identifies the personal property asset. For instance, where the personal property asset is a vehicle, the asset identifier may include a vehicle identification number (VIN). Where the personal property asset is a building or residence, the asset identifier may include an address of the building or residence or a Multiple Listing Service (MLS) number. Asset data 208 may include additional and/or alternative information associated with the personal property asset.

Loan application 206 may also include user data 210 (also referred to as "applicant data") associated with the loan applicant. For instance, user data 210 may include an identifier that uniquely identifies the applicant (e.g., a Social Security Number (SSN)). In the exemplary embodiment, user data 210 may further include a consent indicator, indicating that the loan applicant has provided their consent for the use and/or storage of user data 210 and/or asset data 208 for the purposes of the loan being applied for. In some embodiments, the consent indicator may be provided using a checkbox or radio button on an electronic form (e.g., within an app or website through which the loan applicant is providing information for loan application 206).

Loan application 206 may also include requested loan terms 212. Loan terms 212 may be selected, provided, and/or specified by the loan applicant, and may include requested interest rates, loan amounts, payoff timeline, down payment options, and/or any other loan terms 212. In some embodiments, loan terms 212 provided by the loan applicant may be applied to an offer 236 (described below) of a loan to the loan applicant without adjustment to loan terms 212. In other embodiments, one or more of loan terms 212 may be adjusted before offer 236 is provided to the loan applicant.

In some embodiments, access computing device 104 may be configured to execute one or more credit decisioning processes 214. For instance, access computing device 104 may transmit a query 216 to a credit bureau 218 (or any other third party provider of credit information) using user data 210 identifying the loan applicant. In some embodiments, access computing device 104 may request consent from the loan applicant to transmit query 216. In other embodiments, access computing device 104 may receive such consent within user data 210, as described above. Access computing device 104 may subsequently receive a credit record 220 (or other suitable response) from credit bureau 218. Credit record 220 may include, for instance, a credit score for loan applicant. If credit record 220 indicates that the loan applicant is a suitable candidate for a new loan (e.g., if the loan applicant's credit score is above a minimum threshold credit score), accessing computing device 104 may proceed with the loan registration process. In the exemplary embodiment, access computing device 104 may perform credit decisioning 214 automatically, upon receiving request 204 (e.g., loan application 206).

Access computing device 104 may proceed with an offer process 222. Offer process 22 may include transmitting a query 224 to node 106A. Query 224 may include asset data 208, such as an asset identifier, such that node 106A may identify blockchain 110A associated with the personal property asset identified by asset data 208. Query 224 may cause node 106A to identify blockchain 110A, specifically a last (or most recent) block 226 in blockchain 110A. Last block 226 may include existing loan information 228 describing an existing loan on the personal property asset. Existing loan information may include, for example, asset data 230 associated with the personal property asset (e.g., the asset identifier), user data 232 associated with the loan applicant for the existing loan, and/or lien data 234 describing the existing loan. Lien data 234 may include, for example, an identifier of an existing loan holder (e.g., a loan provider), a start date of the existing loan, an amount of the existing loan, a term of the existing loan, a rate of the existing loan, and/or a per-diem interest rate of the existing loan. User data 232 may include one or more elements similar to and/or matching elements of user data 210. In the exemplary embodiment, existing loan information 228 may be encrypted.

Node 106A may respond to query 224 by transmitting at least some of existing loan information 228 to access computing device 104. For example, node 106A may transmit at least some of lien data 234 to access computing device 104. In the exemplary embodiment, node 106A transmits existing loan information 228 in an encrypted state to access computing device 104. Access computing device 104 may access a public key to decrypt the encrypted existing loan information 228. In some embodiments, access computing device 104 may access the public key from node 106A. For instance, last block 226 may include a public key such that node 106A may provide the public key to access computing device 104 when responding to query 224. Alternatively, access computing device 104 may have the public key stored at a local storage location, such as database 120 (shown in FIG. 1). Access computing device 104 may use the accessed public key to decrypt existing loan information 228 such that access computing device 104 may process existing loan information 228.

Based at least in part on existing loan information, access computing device 104 prepares new loan information associated with a new loan for personal property asset. For instance, the new loan information may include a pay-off amount to pay off the existing loan, a new interest rate, a new loan amount, an identifier of the new loan provider, etc. As described above, the new loan information may include some or all of requested loan terms 212. As part of offer process 222, access computing device 104 may transmit the new loan information to the loan applicant (e.g., to user computing device 112 or to a display device of access computing device 104) as an offer 236. The new loan information may replace or supersede the existing loan information if offer 236 is accepted by the loan applicant.

Access computing device 104 may receive an acceptance notification 238 from the loan applicant, acceptance notification 238 indicating that the loan applicant has accepted offer 236, including all terms set forth in the new loan information. In response to receiving acceptance notification 238, access computing device 104 may proceed to one or more execution processes 240. One example of an execution process 240 may include automatically transmitting an update instruction 242 to node 106A. Update instruction 242 may include the new loan information. Additionally, update instruction 242 may cause node 106A to generate and store a new block (not shown in FIG. 2) subsequent to last block 226, the new block including an encryption of the new loan information and a description of data stored in the last block (e.g., a hash of last black 226).

Another example of an execution process 240 may include executing a smart contract 244. Smart contract 244 may be an electronic contract that is automatically executable upon the satisfaction of one or more execution criteria (e.g., acceptance of offer 236 and/or updating of blockchain 110A). Smart contract 244 may have a suitable format such that smart contract 244 may be stored in blockchain 110A. In the exemplary embodiment, smart contract 244 may include all of the new loan information as well as acceptance notification 238. Smart contract 244 may be stored in a plurality of locations, including at access computing device 104, database 120, and/or within blockchain network 108. In the exemplary embodiment, access computing device 244 may transmit an update instruction (e.g., update instruction 242) to node 106A including an executed smart contract 244. The update instruction may cause node 106A to include executed smart contract 244 in the generated new block and/or to generate another new block including only smart contract 244 and a hash of the previous block. Access computing device 104 may be configured to transmit any number of update instructions to node 106A to generate new blocks with information associated with new loans and/or updates to existing loans.

Node 106A may generate any number of new blocks in accordance with received update instructions. Node 106A may be further configured to distribute any generated blocks 202 to a plurality of nodes 106 within blockchain network 108, such that the plurality of nodes 106 update their respective stored copies of blockchain 110A. Moreover, node 106A may be configured to receive blocks 202 from any of the plurality of nodes 106 for any blockchain 110 and may update its own stored copy of those blockchain(s) 110 with the received blocks 202.

Figure 3:
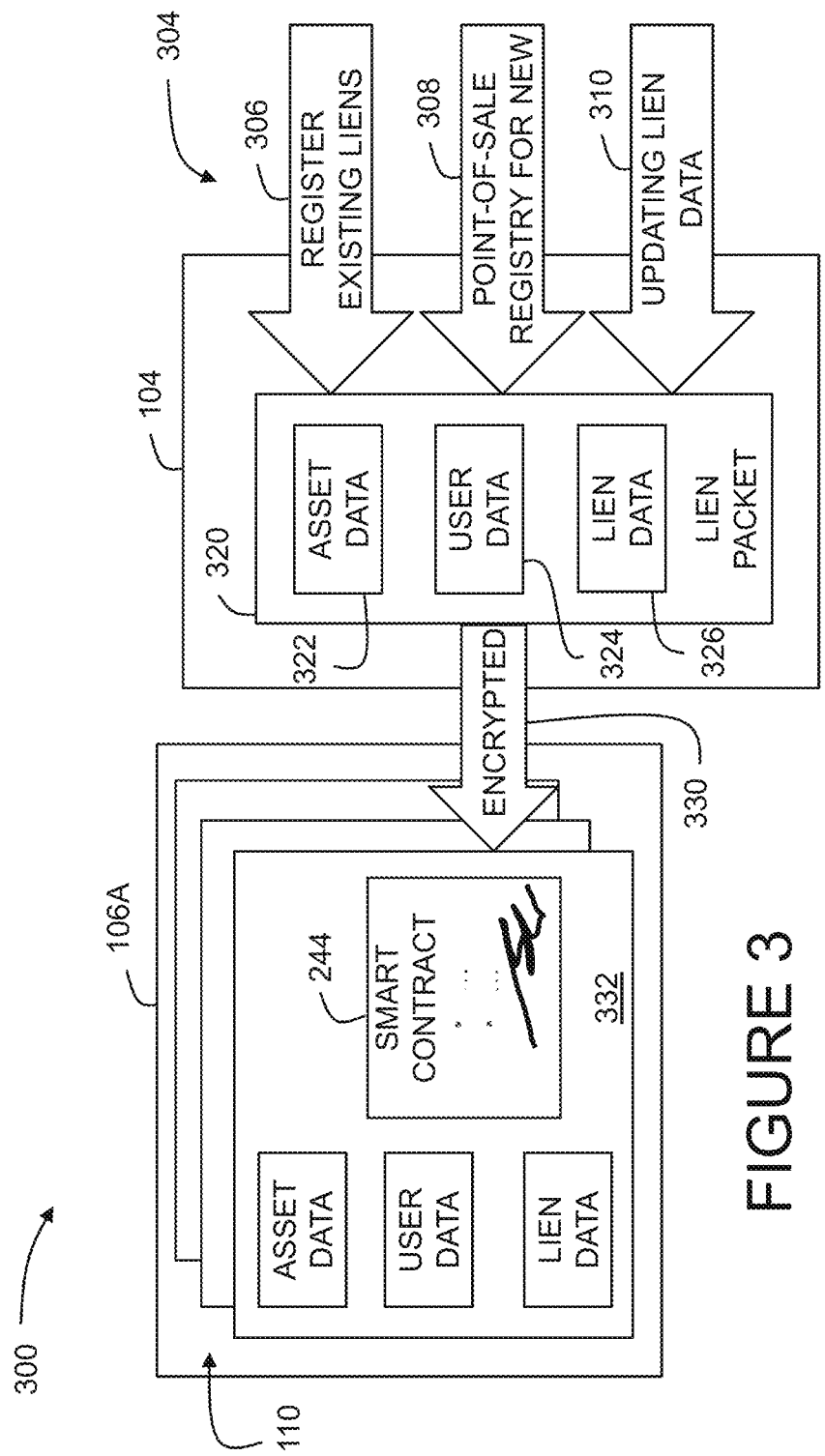
FIG. 3 illustrates a data flow diagram for another aspect of managing property loan information using the LM computer system shown in FIG. 1.

FIG. 3 illustrates a data flow diagram 300 for another aspect of managing property loan information using LM computer system 102 (shown in FIG. 1). Specifically, data flow diagram 300 depicts a plurality of loan management processes performed access computing device 104 in communication with blockchain node computing device 106A (both also shown in FIG. 1).

In the exemplary embodiment, access computing device 104 may receive several requests 304 to access blockchain network 108. Specifically, requests 304 include an existing loan registration request 306, a new loan registration request 308, and an existing loan update request 310. In some embodiments, one or more of requests 304 may be similar to request 204 (shown in FIG. 2).

Access computing device 104 may receive existing loan registration request(s) 306 from one or more loan providers (e.g., from a loan provider computing device or from an input device of access computing device 104) in an initial "registration" process with LM computer system 102. For instance, a loan provider may register to receive the loan management services of LM computer system 102 and may accordingly need to generate blockchains 110 for at least one existing loan already provided by that loan provider. Access computing device 104 may receive a separate lien packet 320 associated with each existing loan.

The lien packet 320 may include asset data 322 associated with the personal property asset for which the loan was granted, user data 324 associated with a person to whom the loan was granted, and/or lien data 326 describing the terms of the existing loan, as agreed upon between the loan provider and the user/loan applicant. The asset data 322 may include vehicle information (for a vehicle covered by the loan or lien), including VIN, make, and model information. The user data 324 may include may SSN, address, and contact information. The lien data 326 may include terms of the lien, such as an amount, term, rate, etc. The lien packet 320 may also include current lien holder information and date of the lien information.

In some embodiments, lien packet 320 may further include information associated with previous loans on the personal property asset. Access computing device 104 may transmit an encrypted instruction 330 to node 106A (which may be similar to update instruction 242). Encrypted instruction 330 may cause node 106A to generate a blockchain 110 associated with the existing loan and/or with any previous loans on the personal property asset identified in lien packet 320. In some embodiments, access computing device 104 may include any executed smart contracts 244 (shown in FIG. 2) within encrypted instruction 330 for storage in blockchain 110.

Access computing device 104 may receive new loan registration request(s) 308 from one or more loan provider(s) (e.g., from a loan provider computing device or from an input device of access computing device 104) when a first or initial loan is being offered for a personal property asset (e.g., a new vehicle). For instance, a loan provider may need to generate a blockchain 110 for the personal property asset to register the new loan. Access computing device 104 may receive a separate lien packet 320 associated with each new loan. The lien packet 320 may include asset data 322 associated with the personal property asset for which the loan was granted, user data 324 associated with a person to whom the loan was granted, and/or lien data 326 describing the terms of the new loan, as agreed upon between the loan provider and the user/loan applicant. Access computing device 104 may transmit an encrypted instruction 330 to node 106A (which may be similar to update instruction 242). Encrypted instruction 330 may cause node 106A to generate a blockchain 110 associated with the personal property asset and the corresponding new loan.

Access computing device may receive existing loan update request(s) 310 from one or more loan provider(s) (e.g., from a loan provider computing device or from an input device of access computing device 104) when new loan is being offered for a personal property asset and/or when terms of an existing loan are being updated. For instance, a loan provider may need to update a blockchain 110 for a personal property asset if a term of the loan is changed, such as a pay-off date or an interest rate. Access computing device 104 may receive a separate lien packet 320 associated with each loan being updated or registered. The lien packet 320 may include asset data 322 associated with the personal property asset for which the loan was granted, user data 324 associated with a person to whom the loan was granted, and/or lien data 326 describing the terms of the new loan and/or the particular updates to one or more terms, as agreed upon between the loan provider and the user/loan applicant. Access computing device 104 may transmit an encrypted instruction 330 to node 106A (which may be similar to update instruction 242). Encrypted instruction 330 may cause node 106A to generate a new block 332 in a blockchain 110 associated with the personal property asset.

Exemplary Blockchain

Figure 4:
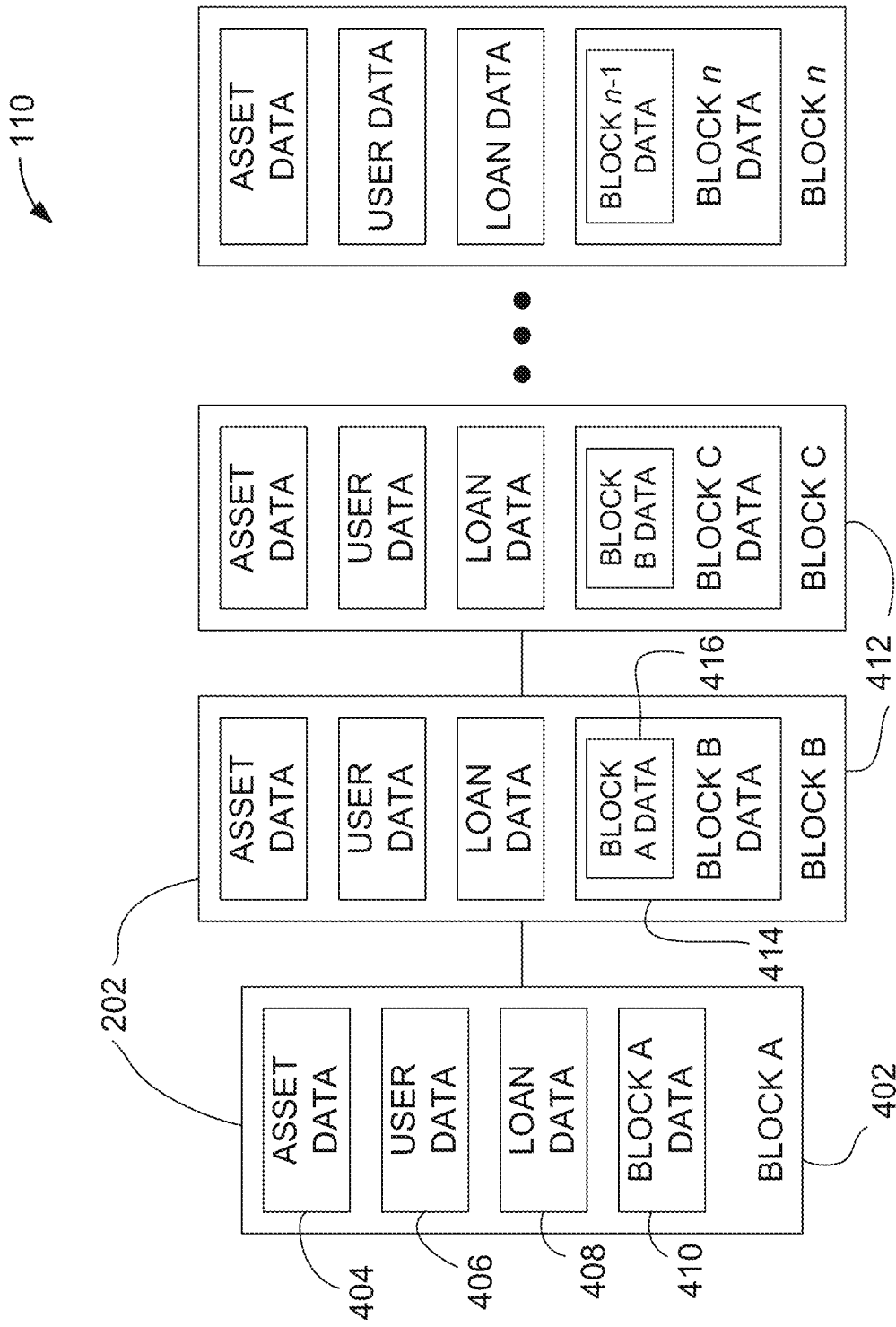
FIG. 4 depicts an exemplary blockchain associated with a personal property asset that may be generated and stored using a plurality of blockchain nodes.

FIG. 4 depicts an exemplary blockchain 110 associated with a personal property asset that may be generated and stored using one or more blockchain nodes 106 of a blockchain network 108 (all shown in FIG. 1). Blockchain network 108 may be a distributed database that maintains a continuously-growing blockchain 110, or list, of ordered records, known as blocks 202 (shown in FIG. 2). Blockchain network 108 may provide an encrypted, distributed, and immutable ledger as blockchains 110 in which loan information associated with a plurality of personal property assets are stored. Each blockchain 110 includes a sequence of one or more blocks 202 that are cryptographically verifiable and enforce a chronological order of data stored in subsequent blocks 202. In one exemplary embodiment, the one or more blocks 202 may include a first block 402 (referred to as "Block A" in FIG. 4) representing a first transaction—or registration of loan information—associated with a personal property asset. In the exemplary embodiment, Block A may store asset data 404 identifying the personal property asset, user data 406 identifying the person to whom the loan was granted, and/or loan data 408, identifying the loan provider of the loan and/or terms of the loan. Block A may further include Block A data 410 associated specifically with Block A. For instance, Block A data 410 may include a timestamp associated with the generation of Block A and/or an identifier of a node 106 at which Block A was generated.

The one or more blocks 202 may additionally include subsequent blocks 412 (referred to individually as "Block B," "Block C," through "Block n" in FIG. 4 and collectively as blocks 412). Each subsequent block 412 may include asset data 404, user data 406, and loan data 408, any of which may be similar to or different from the data stored in Block A. For instance, each subsequent block 412 may include updates or changes to loan data 408 according to updates in the loan on the personal property asset or new loans granted on the personal property asset.

Each subsequent block 412 may also include block data 414 associated with that corresponding block 412. For subsequent blocks 412, block data 414 may not only include data associated specifically with that block 412 (e.g., timestamp, node 106 identifier) but may further include a description of the previous block 412's data. As one specific example, Block B data 414 may include a description 416 of Block A, wherein description 416 may include a hash of Block A. The hash may be generated by executing a hashing function on the data 404, 406, 408, 410 stored in Block A. This continues on, with each block 412 adding on to the next while containing a hash of the previous block(s) 412 in blockchain 110. In this way, the chronological series of data stored in a single blockchain 110 may be verifiable and immutable.

Exemplary System for Blockchain Mining

Figure 5:
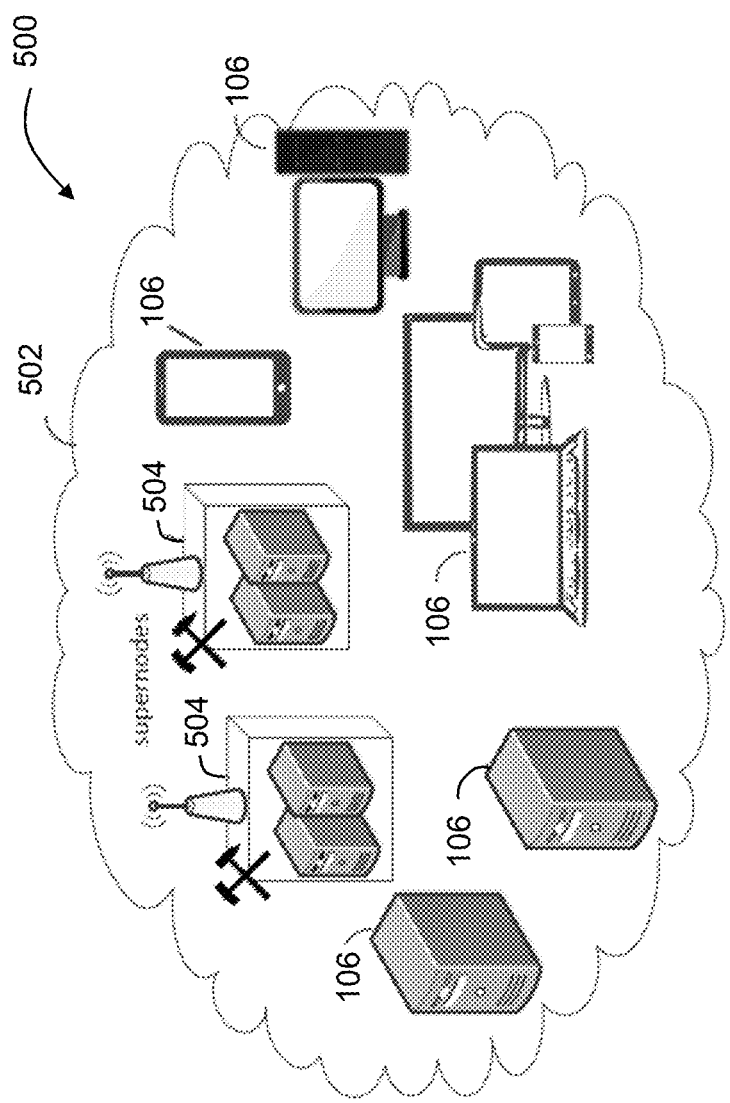
FIG. 5 illustrates a block diagram of an exemplary blockchain mining system in accordance with one embodiment of the present disclosure.

FIG. 5 illustrates a block diagram 500 of a blockchain mining system 502 in accordance with one embodiment of the present disclosure. Blockchain mining system 502 may be integral to and/or otherwise associated with blockchain network 108 (shown in FIG. 1). Blockchain mining system 502 may include a supernode 504 and a plurality of nodes 106 (shown in FIG. 1). Some nodes 106 may just be storing the latest copy of a blockchain 110 (shown in FIG. 1). Other nodes 106 may be miners and are processing blocks 202 (shown in FIG. 2) in blockchain 110. Supernode 204 monitors blockchain 110 and the integrity of system 502. For example, supernode 204 may monitor when different nodes 106 go offline or become unavailable. Supernode 204 may also add nodes 106 to system 502 and ensure that nodes 106 have up-to-date copies of blockchain 110. System 502 may include a plurality of nodes 106 from a plurality of sources to improve or increase the size and the integrity of each blockchain 110.

In some embodiments, nodes 106 may include one or more access computing device(s) 104 and/or one or more user computing device(s) 112 (shown in FIG. 1). Nodes 106 may additionally or alternatively include other computer devices of one or more loan providers. Nodes 106 may also include computer devices, such as servers, workstations, and mobile devices of a blockchain federation or network (e.g., blockchain network 108) that may extend outside of the control of the loan provider(s).

In some embodiments, a blockchain 110 may be maintained for each personal property asset subject to loan terms. In other embodiments, each loan provider maintains one or more blockchains 110, where each blockchain 110 contains the transactions or registrations from multiple loans offered by that loan provider.

When a new loan or loan update is registered at a node 106 (e.g., access computing device 104 transmits instructions to that node 106), the node 106 may wirelessly stream the data to be added to the corresponding blockchain 110. This data may be added to the appropriate blocks 202.

The data may be passed to the various other nodes 106 in system 502, where the data will be stored in blockchains 110 in each of the various nodes 106 storing the blockchain 110. In some embodiments, the data may be transferred and each node 106 generates the next block 202 in the blockchain 110. In other embodiments, the originating node 106 may generate the next block 202 and transmit the block 202 to the other nodes 106. In still other embodiments, supernode 504 may generate the next block 202 and transmit the block 202 to the nodes 106.

Figure 6:
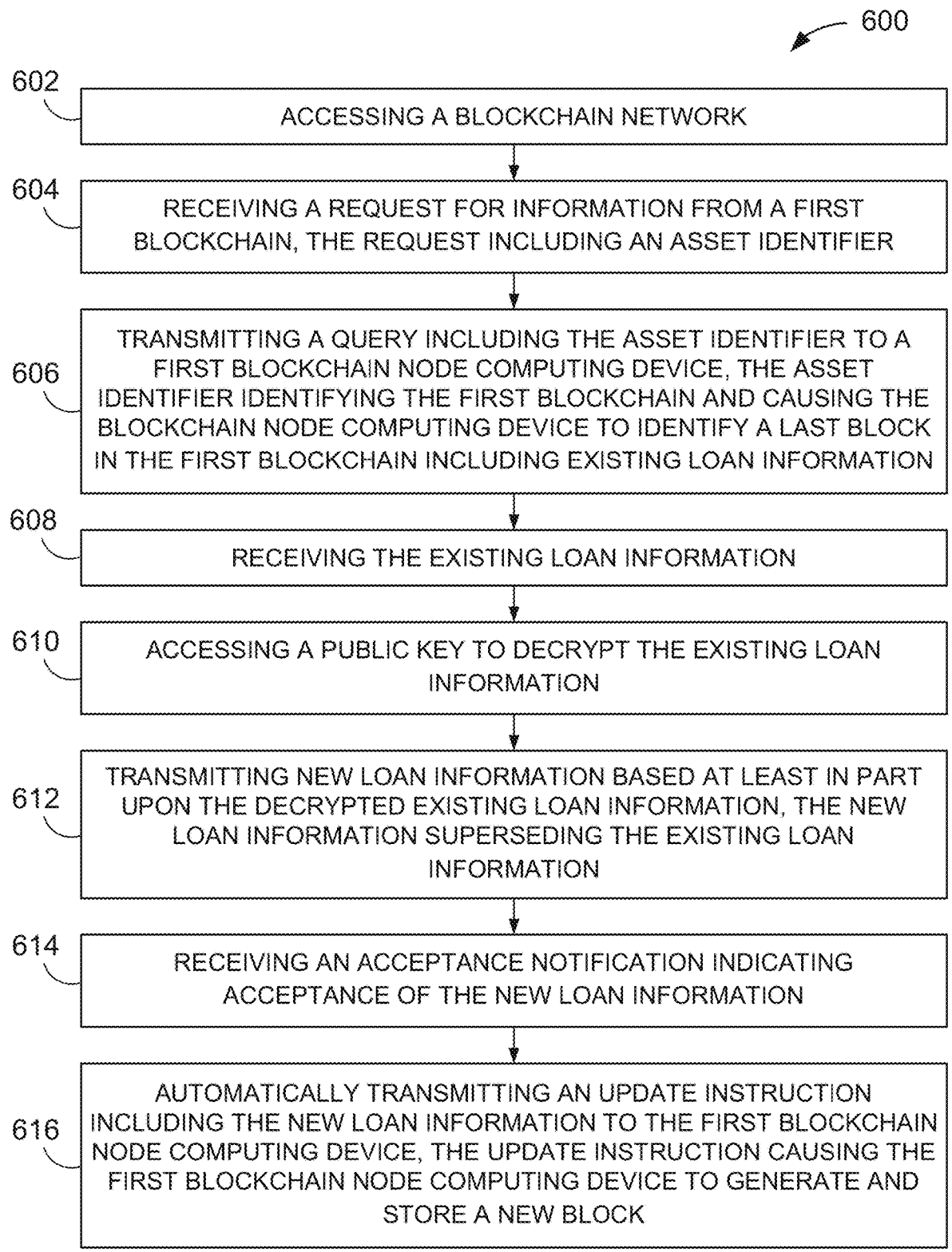
FIG. 6 illustrates a flow chart of an exemplary computer-implemented process for one aspect of managing property loan information using the LM computer system shown in FIG. 1.

Exemplary Computer-Implemented Processes for Managing Property Loan Information Using Blockchains FIG. 6 illustrates a flow chart of an exemplary computer-implemented process 600 for one aspect of managing property loan information using LM computer system 102 (shown in FIG. 1). One or more steps of process 600 may be implemented using access computing device 104 (also shown in FIG. 1). Additionally or alternatively, one or more steps of process 600 may be implemented using one or more nodes 106 and/or user computing device 112 (both also shown in FIG. 1).

In the exemplary embodiment, process 600 may include accessing 602 a blockchain network through a first blockchain node computing device. The blockchain network may include a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block. Process 600 may also include receiving 604 a request for information from a first blockchain of the plurality of blockchains, the request including an asset identifier associated with a personal property asset. Process 600 may further include transmitting 606 a query including the asset identifier to the first blockchain node computing device, the asset identifier identifying the first blockchain and causing the blockchain node computing device to identify a last block in the first blockchain, the last block including an encryption of existing loan information for an existing loan associated with the personal property asset.

In addition, process 600 may include receiving 608 the encryption of the existing loan information from the first blockchain node computing device and accessing 610 a public key to decrypt the encryption of the existing loan information. Process 600 may further include transmitting 612 new loan information for a new loan associated with the personal property asset based at least in part upon the decrypted existing loan information, the new loan information superseding the existing loan information, and receiving 614 an acceptance notification indicating acceptance of the new loan information. Process 600 may still further include, in response to receiving 614, automatically transmitting 616 an update instruction to the first blockchain node computing device, the update instruction including the new loan information, the update instruction causing the first blockchain node computing device to generate and store a new block subsequent to the last block, the new block including an encryption of the new loan information and a description of data stored in the last block. Process 600 may include additional, fewer, and/or alternative steps to those illustrated in FIG. 6.

Exemplary User Computer Device

Figure 7:
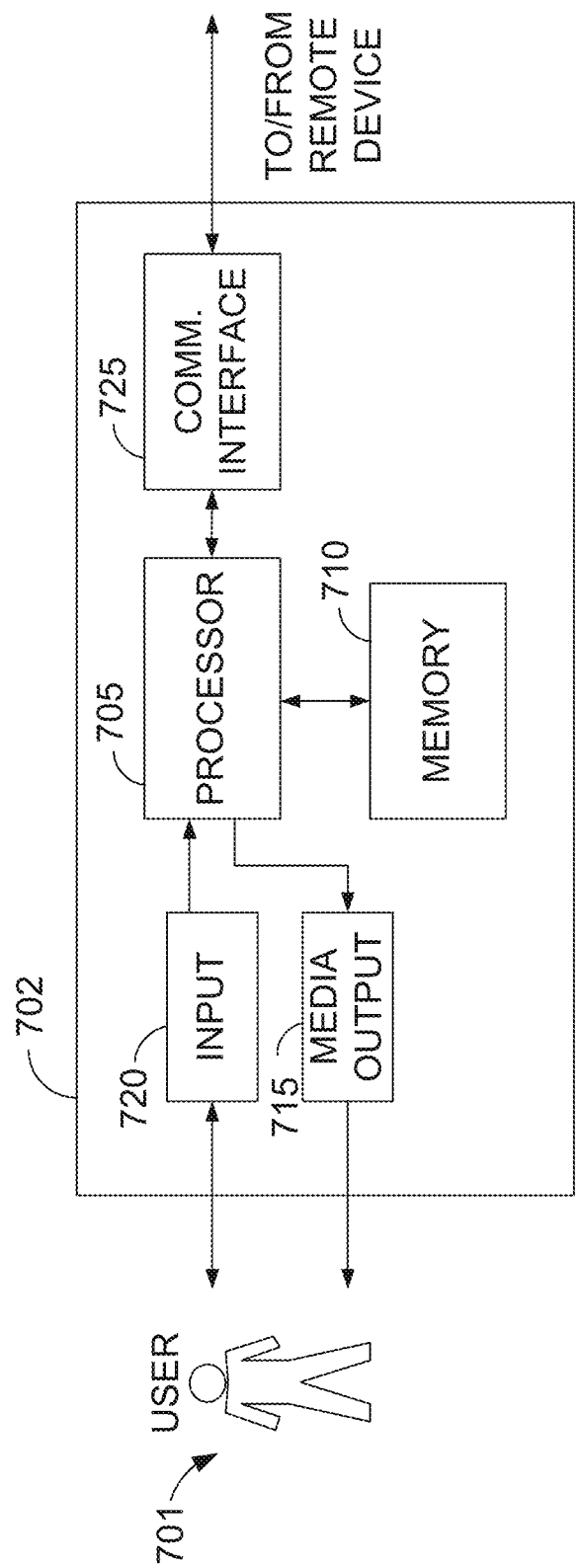
FIG. 7 illustrates an exemplary configuration of a user computing device that may be used in the LM computer system shown in FIG. 1.

FIG. 7 illustrates an exemplary configuration of a user computer device 702 that may be used in LM computer system 102 (shown in FIG. 1). User computer device 702 may be operated by a user 701. User computer device 702 may include, but is not limited to, access computing device 104, blockchain node computing device(s) 106, and/or user computing device 112 (all shown in FIG. 1). User computer device 702 may include a processor 705 for executing instructions. In some embodiments, executable instructions may be stored in a memory area 710. Processor 705 may include one or more processing units (e.g., in a multi-core configuration). Memory area 710 may be any device allowing information such as executable instructions and/or transaction data to be stored and retrieved. Memory area 710 may include one or more computer readable media.

User computer device 702 may also include at least one media output component 715 for presenting information to user 701. Media output component 715 may be any component capable of conveying information to user 701. In some embodiments, media output component 715 may include an output adapter (not shown) such as a video adapter and/or an audio adapter. An output adapter may be operatively coupled to processor 705 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 715 may be configured to present a graphical user interface (e.g., a web browser and/or a client application) to user 701. A graphical user interface may include, for example, a Tillable form to provide one or more of asset data 208, user data 210, and/or loan terms 212 (shown in FIG. 2). In some embodiments, user computer device 702 may include an input device 720 for receiving input from user 701. User 701 may use input device 720 to, without limitation, provide one or more of asset data 208, user data 210, and/or loan terms 212, access an offer 242 (also shown in FIG. 2) for a new loan, and/or execute a contract. Input device 720 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 715 and input device 720.

Stored in memory area 710 are, for example, computer readable instructions for providing a user interface to user 701 via media output component 715 and, optionally, receiving and processing input from input device 720. A user interface may include, among other possibilities, a web browser and/or a client application. Web browsers enable users, such as user 701, to display and interact with media and other information typically embedded on a web page or a website from, for example, a loan provider. A client application may allow user 701 to interact with, for example, access computing device 104 and/or node(s) 106. For example, instructions may be stored by a cloud service, and the output of the execution of the instructions sent to the media output component 715.

User computer device 702 may also include a communication interface 725, communicatively coupled to a remote device such as access computing device 104, and/or node(s) 106. Communication interface 725 may include, for example, a wired or wireless network adapter and/or a wireless data transceiver for use with a mobile telecommunications network.

Exemplary Server Computer Device

Figure 8:
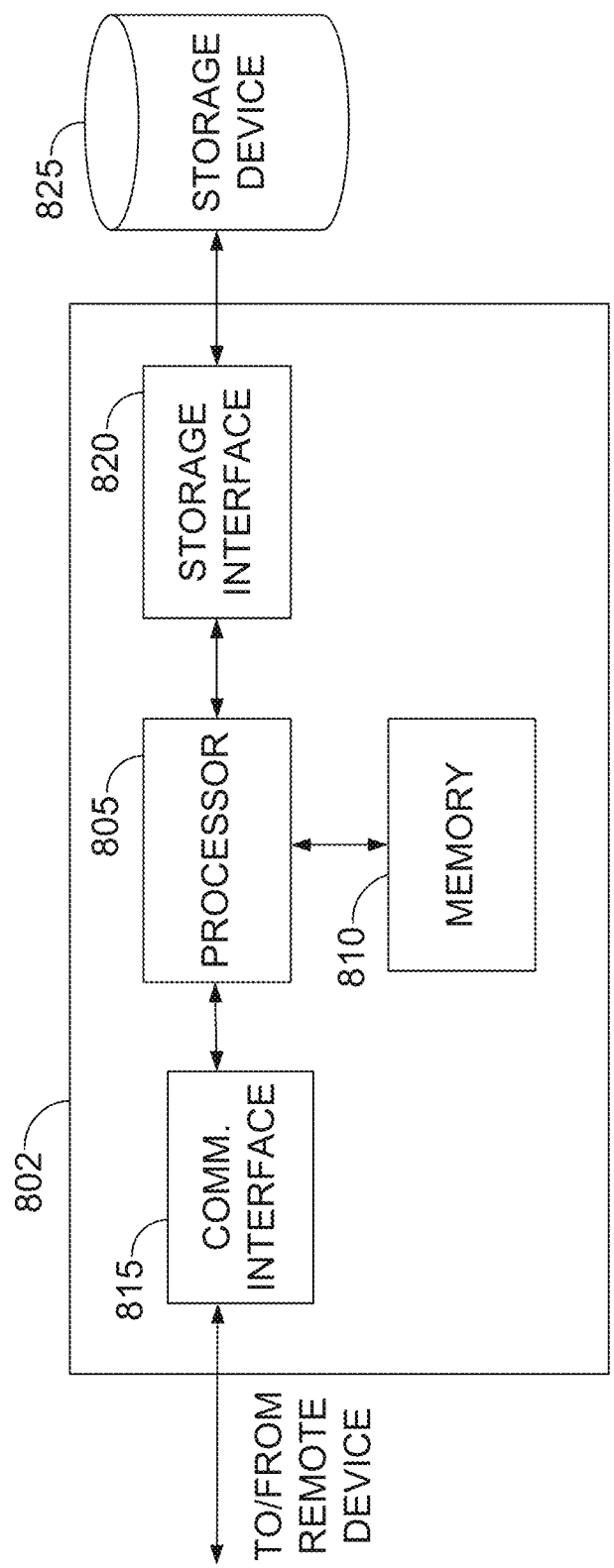
FIG. 8 illustrates an exemplary configuration of a server computing device that may be used in the LM computer system shown in FIG. 1.

FIG. 8 illustrates an exemplary configuration of a server computer device 802 that may be used in LM computer system 102 (shown in FIG. 1). Server computer device 802 may include, but is not limited to, access computing device 104 and/or node(s) 106 (both also shown in FIG. 1). Server computer device 802 may include a processor 805 for executing instructions. Instructions may be stored in a memory area 810. Processor 805 may include one or more processing units (e.g., in a multi-core configuration).

Processor 805 may be operatively coupled to a communication interface 815 such that server computer device 802 is capable of communicating with a remote device such as another server computer device 802, a user computer device 702 (shown in FIG. 7), user computing device 112 (shown in FIG. 1), access computing device 104, and/or node(s) 106 (for example, using wireless communication or data transmission over one or more radio links or digital communication channels). For example, communication interface 815 may receive requests from user computer devices 702 via the Internet.

Processor 805 may also be operatively coupled to a storage device 825. Storage device 825 may be any computer-operated hardware suitable for storing and/or retrieving data, such as, but not limited to, data associated with database 120 (shown in FIG. 1). In some embodiments, storage device 825 may be integrated in server computer device 802. For example, server computer device 802 may include one or more hard disk drives as storage device 825. In other embodiments, storage device 825 may be external to server computer device 802 and may be accessed by a plurality of server computer devices 802. For example, storage device 825 may include a storage area network (SAN), a network attached storage (NAS) system, and/or multiple storage units such as hard disks and/or solid state disks in a redundant array of inexpensive disks (RAID) configuration.

In some embodiments, processor 805 may be operatively coupled to storage device 825 via a storage interface 820. Storage interface 820 may be any component capable of providing processor 805 with access to storage device 825. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 825.

Processor 805 may execute computer-executable instructions for implementing aspects of the disclosure. In some embodiments, the processor 805 may be transformed into a special purpose microprocessor by executing computer-executable instructions or by otherwise being programmed. For example, the processor 805 may be programmed with the instruction such as illustrated in FIG. 6.

Exemplary Computer Device

Figure 9:
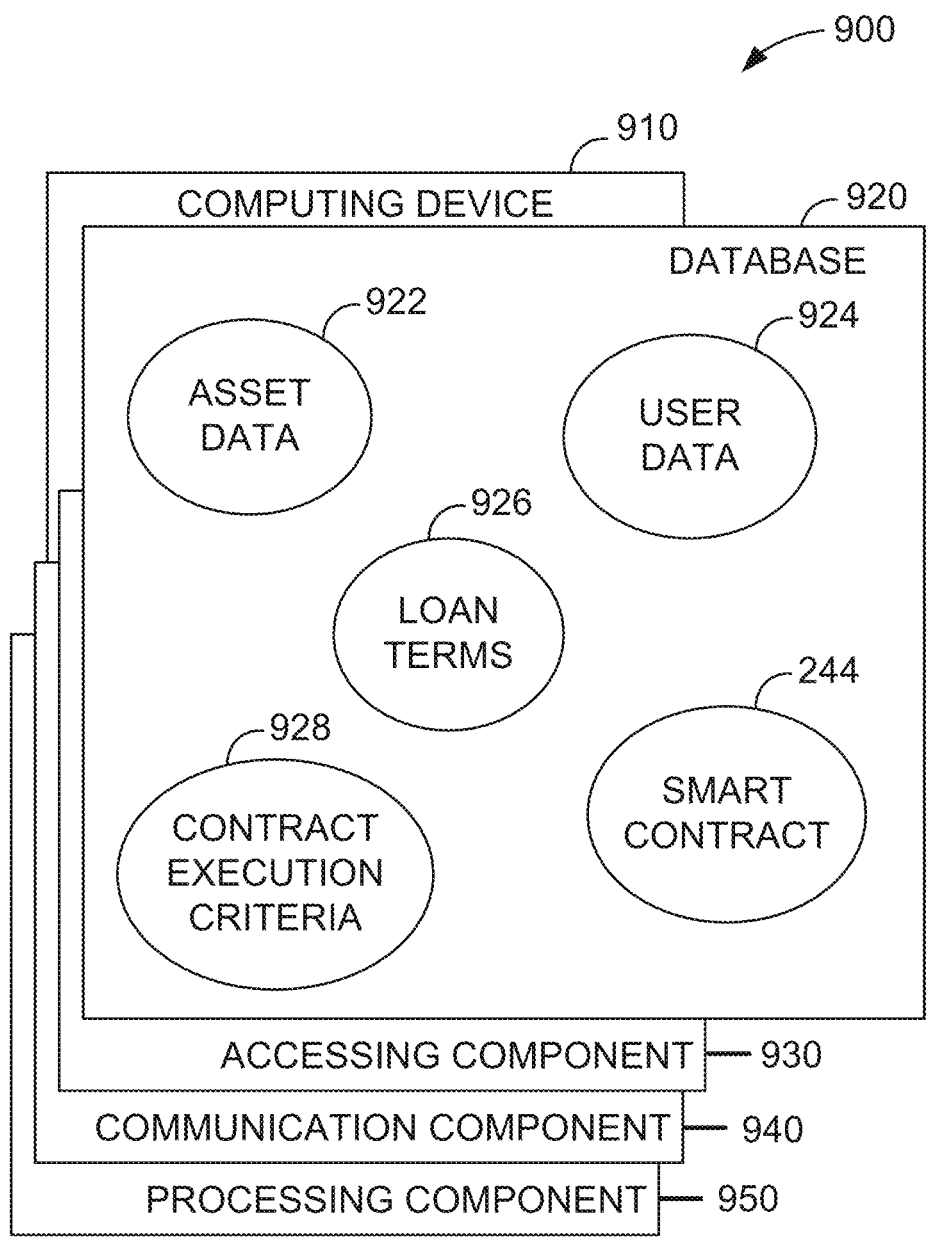
FIG. 9 illustrates a diagram of components of one or more exemplary computing devices that may be used in the LM computer system shown in FIG. 1.

FIG. 9 depicts a diagram 900 of components of one or more exemplary computing devices 910 that may be used in LM computer system 102 (shown in FIG. 1). In some embodiments, computing device 910 may be similar to access computing device 104 (also shown in FIG. 1). In other embodiments, computing device 910 may be similar to node(s) 106 and/or user computing device 112 (both also shown in FIG. 1). In the exemplary embodiment, computing device 910 may include a database 920 for storing information. For example, database 920 may store asset data 922, user data 924, loan terms 926, smart contracts 244 (also shown in FIG. 2), contract execution criteria 928, and/or any other data associated with one or more personal property loan(s) provided a loan provider. In some embodiments, database 920 is similar to database 120 (shown in FIG. 1).

Database 920 may be coupled with several separate components within computing device 910, which perform specific tasks. Specifically, computing device 910 may include an accessing component 930 enabling access to remote computing devices (e.g., nodes 106). Computing device 910 may also including a communication component 940, for receiving requests (e.g., receiving 604), transmitting queries (e.g., transmitting 606), receiving loan information (e.g., receiving 608), transmitting loan information (e.g., receiving 612), receiving acceptance notifications (e.g., receiving 614) and/or transmitting update instructions (e.g., transmitting 616, all shown in FIG. 6). Computing device 910 may further include a processing component 950 to assist with execution of computer-executable instructions associated with LM computer system 102.

Further Considerations

Building the solution to the above-referenced problems with current loan management and registration systems through blockchain technology may eliminate the need for a third-party data provider, may be more secure due to decentralization and encryption, may facilitate hosting smart contracts that execute once certain parameters are met (transfer of funds if customer/vehicle verified, even transfer of title when funds received, etc.). In addition, the systems and methods described herein may provide seamless lien data transmission between lending institutions to record information and execute transactions without requiring a validating third party. Moreover, technology could support expansion into other inter-institution processes like funds transfer and title exchanges.

The systems and methods described herein may improve a loan provider's ability to provide better customer experience at a lower cost. It may provide a base layer (e.g., a functional blockchain and ability to execute smart contracts) to scale seamless data exchange between financial institutions and eliminate need for third party-data consortiums. In addition to the blockchain techniques described herein, alternative and/or future developed blockchain techniques may be used with the present embodiments.

In one embodiment of the present disclosure, an access computing device for managing property loan information using blockchains may be provided. The access computing device may include at least one processor in communication with at least one memory device. The access computing device may be configured to access a blockchain network through a first blockchain node computing device, the blockchain network including a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block. The access computing device may be further configured to receive a request for information from a first blockchain of the plurality of blockchains, the request including an asset identifier associated with a personal property asset, and transmit a query including the asset identifier to the first blockchain node computing device, the asset identifier identifying the first blockchain and causing the blockchain node computing device to identify a last block in the first blockchain, the last block including an encryption of existing loan information for an existing loan associated with the personal property asset. The access computing device may also be configured to receive the encryption of the existing loan information from the first blockchain node computing device, access a public key to decrypt the encryption of the existing loan information, and transmit new loan information for a new loan associated with the personal property asset based at least in part upon the decrypted existing loan information, the new loan information superseding the existing loan information. The access computing device may be still further configured to receive an acceptance notification indicating acceptance of the new loan information, and in response to receiving the acceptance notification, automatically transmit an update instruction to the first blockchain node computing device, the update instruction including the new loan information, the update instruction causing the first blockchain node computing device to generate and store a new block subsequent to the last block, the new block including an encryption of the new loan information and a description of data stored in the last block.

In some embodiments, the access computing device may be further configured to receive the request for information from a loan applicant applying for a new loan on the personal property asset. In some instances, the access computing device may be further configured to receive the request for information from a user computing device being used to submit the loan application. In some instances, the access computing device may further include an input device in communication with the at least one processor, the access computing device further configured to receive the request for information from the input device.

In some embodiments, request for information may include a loan application from a loan applicant applying for the new loan. The loan application may include at least one of applicant data associated with the loan applicant and requested loan terms associated with the new loan. The applicant data may include at least one of an applicant identifier and an applicant consent to use at least one of the applicant data and the asset identifier to query the blockchain network. In some instance, the access computing device may be further configured to perform one or more credit decisioning processes before transmitting the new loan information. The access computing device may be further configured to automatically perform the one or more credit decisioning processes upon receiving the request for information.

In some embodiments, the personal property asset may include a vehicle, and the asset identifier may include a vehicle identification number (VIN). In other embodiments, the personal property asset may include a building, and the asset identifier may include at least one of an address of the building and a Multiple Listing Service (MLS) number.

The access computing device may be further configured to access the public key from the first blockchain node computing device.

The access computing device may be further configured to access the public key from a local storage device communicatively coupled to the access computing device.

In some embodiments, the existing loan information may include at least one of an identifier of an existing loan holder, a start date of the existing loan, an amount of the existing loan, a term of the existing loan, a rate of the existing loan, and a per-diem interest rate of the existing loan in an encrypted format.

The access computing device may be further configured to, in response to receiving the acceptance notification, electronically execute a contract associated with the new loan, wherein the update instruction further includes the electronically executed contract, such that the new block further includes an encryption of the executed contract. In some instances, the contract may include a smart contract.

In some embodiments, the access computing device may be further configured to encrypt the new loan information prior to automatically transmitting the update instruction.

In some embodiments, the access computing device may be further configured to transmit the update instruction including the new loan information in an unencrypted format, the update instruction further causing the first blockchain node computing device to encrypt the new loan information.

The access computing device may be further configured to receive an update to the new loan information, and in response to receiving the update, transmit a subsequent update instruction to the first blockchain node computing device, the subsequent update instruction causing the first blockchain node computing device to generate a subsequent new block in the first blockchain, the subsequent new block including the update to the new loan information.

In some aspects of the present disclosure, at least one non-transitory computer-readable storage medium having computer-executable instructions embodied thereon may be provided. When executed by at least one processor of an access computing device, the computer-executable instructions may cause the at least one processor to access a blockchain network through a first blockchain node computing device, the blockchain network including a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block. The computer-executable instructions may also cause the at least one processor to receive a request for information from a first blockchain of the plurality of blockchains, the request including an asset identifier associated with a personal property asset, and transmit a query including the asset identifier to the first blockchain node computing device, the asset identifier identifying the first blockchain and causing the blockchain node computing device to identify a last block in the first blockchain, the last block including an encryption of existing loan information for an existing loan associated with the personal property asset. The computer-executable instructions may further cause the at least one processor to receive the encryption of the existing loan information from the first blockchain node computing device, access a public key to decrypt the encryption of the existing loan information, and transmit new loan information for a new loan associated with the personal property asset based at least in part upon the decrypted existing loan information, the new loan information superseding the existing loan information. The computer-executable instructions may still further cause the at least one processor to receive an acceptance notification indicating acceptance of the new loan information, and in response to receiving the acceptance notification, automatically transmit an update instruction to the first blockchain node computing device, the update instruction including the new loan information, the update instruction causing the first blockchain node computing device to generate and store a new block subsequent to the last block, the new block including an encryption of the new loan information and a description of data stored in the last block.

In some embodiments, the computer-executable instructions may further cause that at least one processor to receive the request for information from a loan applicant applying for a new loan on the personal property asset. The computer-executable instructions may further cause that at least one processor to receive the request for information from a user computing device being used to submit the loan application. The computer-executable instructions may further cause that at least one processor to receive the request for information from an input device in communication with the at least one processor. The request for information may include a loan application from a loan applicant applying for the new loan. The loan application may include at least one of applicant data associated with the loan applicant and requested loan terms associated with the new loan. The applicant data may include at least one of an applicant identifier and an applicant consent to use at least one of the applicant data and the asset identifier to query the blockchain network. The computer-executable instructions may further cause that at least one processor to perform one or more credit decisioning processes before transmitting the new loan information. The computer-executable instructions may further cause that at least one processor to automatically perform the one or more credit decisioning processes upon receiving the request for information.

In some embodiments, the personal property asset may include a vehicle, and the asset identifier may include a vehicle identification number (VIN). In other embodiments, the personal property asset may include a building, and the asset identifier may include at least one of an address of the building and a Multiple Listing Service (MLS) number.

The computer-executable instructions may further cause that at least one processor to access the public key from the first blockchain node computing device.

The computer-executable instructions may further cause that at least one processor to access the public key from a local storage device communicatively coupled to the access computing device.

The existing loan information may include at least one of an identifier of an existing loan holder, a start date of the existing loan, an amount of the existing loan, a term of the existing loan, a rate of the existing loan, and a per-diem interest rate of the existing loan in an encrypted format.

The computer-executable instructions may further cause that at least one processor to, in response to receiving the acceptance notification, electronically execute a contract associated with the new loan, wherein the update instruction further includes the electronically executed contract, such that the new block further includes an encryption of the executed contract. The contract may include a smart contract.

The computer-executable instructions may further cause that at least one processor to encrypt the new loan information prior to automatically transmitting the update instruction.

The computer-executable instructions may further cause that at least one processor to transmit the update instruction including the new loan information in an unencrypted format, the update instruction further causing the first blockchain node computing device to encrypt the new loan information.

The computer-executable instructions further cause that at least one processor to receive an update to the new loan information, and in response to receiving the update, transmit a subsequent update instruction to the first blockchain node computing device, the subsequent update instruction causing the first blockchain node computing device to generate a subsequent new block in the first blockchain, the subsequent new block including the update to the new loan information.

In another aspect of the present disclosure, a loan management (LM) computer system for managing property loan information using blockchains may be provided. The LM computer system may include a first blockchain node computing device integral to a blockchain network, the blockchain network including a plurality of blockchain node computing devices including the first blockchain node computing device, the first blockchain node computing device configured to store a local copy of a plurality of blockchains, each blockchain including a sequence of one or more blocks that are cryptographically verifiable and enforce a chronological order of data stored in subsequent blocks, wherein each block after a first block includes a description of data stored in a previous block. The LM computer system may also include an access computing device communicatively coupled to the first blockchain node computing device such that the access computing device has access to the plurality of blockchains stored in the blockchain network. The LM computer system may be configured to receive, at the access computing device, a request to access the blockchain network, the request including an asset identifier associated with a personal property asset, and transmit, from the access computing device to the first blockchain node computing device, an instruction associated with the request, the instruction including the asset identifier. The LM computer system may be further configured to, in response to receiving the query, at the first blockchain node computing device, when the asset identifier is associated with a first existing blockchain stored at the first blockchain node computing device, retrieve encrypted existing loan information from a last block of the first existing blockchain and transmit the encrypted existing loan information to the access computing device. The LM computer system may be further configured to, in response to receiving the query, at the first blockchain node computing device, when the asset identifier is not associated with any existing blockchain stored at the first blockchain node computing device, generate a first block of a new blockchain associated with the asset identifier.

In some embodiments, the request to access the blockchain network may include a new loan registration request, the new loan registration request including the asset identifier and new loan information associated with a new loan on the personal property asset. The LM computer system may be further configured to, at the first blockchain node computing device, generate the first block of the new blockchain including the new loan information in an encrypted format.

The request to access the blockchain network may include an existing loan registration request, the existing loan registration request including the asset identifier and existing loan information associated with an existing loan on the personal property asset that is not registered with the blockchain network. The LM computer system may be further configured to, at the first blockchain node computing device, generate the first block of the new blockchain including the existing loan information in an encrypted format.

The request to access the blockchain network may include an existing loan update request, the existing loan update request including the asset identifier and an updated loan term associated with an existing loan on the personal property asset. The LM computer system may be further configured to, at the first blockchain node computing device, identify the first existing blockchain associated with the personal property asset based at least in part upon the asset identifier, generate a hash of the last block of the first existing blockchain, and generate a new block for the first existing blockchain, the new block including the updated loan term in an encrypted format and the hash of last block.

The request may include a loan application for a new loan on the personal property asset. The LM computer system may be further configured to access, at the access computing device, a public key to decrypt the encrypted existing loan information, transmit, from the access computing device to a loan applicant, new loan information for the new loan based at least in part upon the decrypted existing loan information, the new loan information superseding the existing loan information, receive, at the access computing device from the loan applicant, an acceptance notification indicating acceptance of the new loan information, in response to the acceptance notification, automatically transmit, from the access computing device to the first blockchain node computing device, an update instruction, the update instruction including the new loan information, and in response to the update instruction, generate, at the first blockchain node computing device, a new block subsequent to the last block, the new block including an encryption of the new loan information and a description of data stored in the last block.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer-implemented method of operating a computer system to manage information using blockchains, the method implemented using an access computing device of the computer system, the method comprising:
   receiving a request for information that is stored in a first blockchain, the request including: (i) an asset identifier associated with a personal property asset, and (ii) a user identifier associated with the user;
   in response to receiving the request, transmitting a query including the asset identifier and the user identifier to a blockchain node computing device, the asset identifier prompting the blockchain node computing device to retrieve a first blockchain, the user identifier prompting the blockchain node computing device to match the user identifier with information in a last block in the first blockchain, the last block including an encryption of first transaction information for an existing first transaction associated with the personal property asset and the user;
   receiving the encryption of the first transaction information from the blockchain node computing device;
   receiving, from a remote computing device associated with the user, an acceptance notification indicating acceptance of a second transaction associated with the personal property asset including second transaction information, the second transaction information representing an update to the first transaction information; and
   in response to said receiving the acceptance notification:
      generating a smart contract associated with the second transaction;
      electronically executing the smart contract, including updating a title associated with the personal property asset;
      encrypting the second transaction information and a representation of the executed smart contract; and
      automatically transmitting an update instruction to the blockchain node computing device, the update instruction causing the blockchain node computing device to generate and store a new block subsequent to the last block, the new block including the encryption of the second transaction information.

2. The computer-implemented method of claim 1, wherein said receiving a request for information from a user comprises receiving the request for information or a loan application from a loan applicant applying for a new loan on the personal property asset.

3. The computer-implemented method of claim 2, wherein receiving a loan application comprises receiving the loan application further including requested loan terms associated with the new loan.

4. The computer-implemented method of claim 2, further comprising performing one or more credit decisioning processes before accepting the second transaction receiving the acceptance notification.

5. The computer-implemented method of claim 4, wherein performing one or more credit decisioning processes comprises automatically performing the one or more credit decisioning processes upon receiving the request for information.

6. The computer-implemented method of claim 1, wherein the personal property asset includes a vehicle, and wherein receiving a request for information including an asset identifier comprises receiving the asset identifier including a vehicle identification number (VIN).

7. The computer-implemented method of claim 1, wherein the personal property asset includes a building, and wherein receiving a request for information including an asset identifier comprises receiving the asset identifier including at least one of an address of the building and a Multiple Listing Service (MLS) number.

8. The computer-implemented method of claim 1, wherein receiving the encryption of the first transaction information comprises receiving encrypted existing loan information including at least one of an identifier of an existing loan holder, a start date of the existing loan, an amount of the existing loan, a term of the existing loan, a rate of the existing loan, and a per-diem interest rate of the existing loan in an encrypted format.

9. The computer-implemented method of claim 1, further comprising:
   receiving an update to the second transaction information; and
   in response to said receiving an update, transmitting a subsequent update instruction to the blockchain node computing device, the subsequent update instruction causing the blockchain node computing device to generate a subsequent new block in the first blockchain, the subsequent new block including the update to the second transaction information.

10. The computer-implemented method of claim 1, further comprising generating the smart contract for the second transaction using the accepted second transaction information.

11. The computer-implemented method of claim 1, further comprising encrypting the second transaction information and a representation of the executed smart contract using an encryption scheme associated with a public key.

12. The computer-implemented method of claim 11, wherein encrypting the second transaction information comprising generating a hash of the second transaction information.

13. The computer-implemented method of claim 1, further comprising accessing a public key for decrypting the first transaction information.

14. The computer-implemented method of claim 13, wherein accessing the public key comprises accessing the public key from the blockchain node computing device.

15. The computer-implemented method of claim 13, wherein accessing the public key comprises accessing the public key from a local storage location.

16. The computer-implemented method of claim 1, wherein receiving the request for information further comprises receiving the request including (iii) a user consent to use the asset identifier and the user identifier in a blockchain query.

17. An access computing device for managing information using blockchains, the access computing device comprising at least one processor in communication with at least one memory device, the access computing device configured to:
  receive a request for information that is stored in a first blockchain, the request including: (i) an asset identifier associated with a personal property asset, and (ii) a user identifier associated with the user;
  in response to receiving the request, transmit a query including the asset identifier and the user identifier to a blockchain node computing device, the asset identifier prompting the blockchain node computing device to retrieve a first blockchain, the user identifier prompting the blockchain node computing device to match the user identifier with information in a last block in the first blockchain, the last block including an encryption of first transaction information for an existing first transaction associated with the personal property asset and the user;
  receive the encryption of the first transaction information from the blockchain node computing device;
  receive, from a remote computing device associated with the user, an acceptance notification indicating acceptance of a second transaction associated with the personal property asset including second transaction information, the second transaction information representing an update to the first transaction information; and
  in response to receiving the acceptance notification:
    generate a smart contract associated with the second transaction;
    electronically execute the smart contract, including updating a title associated with the personal property asset;
    encrypt the second transaction information and a representation of the executed smart contract; and
    automatically transmit an update instruction to the blockchain node computing device, the update instruction causing the blockchain node computing device to generate and store a new block subsequent to the last block, the new block including the encryption of the second transaction information.

18. The access computing device of claim 17, further configured to access a public key for decrypting the encryption of the first transaction information.

* * * * *